US006907819B2

(12) United States Patent
Kernan

(10) Patent No.: US 6,907,819 B2
(45) Date of Patent: Jun. 21, 2005

(54) FLIP RAMP MECHANICAL INTERLOCK FOR APPLIANCE

(75) Inventor: Colin Michael Kernan, Stamford, CT (US)

(73) Assignee: Conair Corporation, Stamford, CO (US)

(*) Notice: Subject to any disclaimer, the term of this patent is extended or adjusted under 35 U.S.C. 154(b) by 0 days.

(21) Appl. No.: 10/878,245

(22) Filed: Jun. 28, 2004

(65) Prior Publication Data

US 2005/0000370 A1 Jan. 6, 2005

Related U.S. Application Data

(60) Provisional application No. 60/483,934, filed on Jul. 1, 2003.

(51) Int. Cl.[7] .............................. A23L 1/00; A23N 1/00; A23N 1/02; A47J 43/07; B02C 18/12
(52) U.S. Cl. .............................. 99/492; 99/348; 99/511; 241/36; 241/37.5; 241/92; 366/205; 366/601
(58) Field of Search ................... 99/348, 495, 509–511, 99/492; 366/601, 205, 206; 241/36, 37.5, 282.1, 282.2, 199.12, 92

(56) References Cited

U.S. PATENT DOCUMENTS

| | | | | |
|---|---|---|---|---|
| 3,892,365 A | * | 7/1975 | Verdun | 99/492 X |
| 4,216,917 A | * | 8/1980 | Clare et al. | 99/492 X |
| 4,226,373 A | * | 10/1980 | Williams | 99/492 X |
| 4,321,741 A | | 3/1982 | Williams | |
| 4,371,118 A | | 2/1983 | Sontheimer et al. | |
| 4,396,159 A | | 8/1983 | Podell | |
| 4,471,915 A | | 9/1984 | Levin et al. | |
| 4,506,836 A | * | 3/1985 | Williams | 99/492 X |
| 4,512,522 A | * | 4/1985 | Williams | 99/492 X |
| 4,523,470 A | | 6/1985 | Müller et al. | |
| 4,523,720 A | * | 6/1985 | Behringer et al. | 99/492 X |
| 4,540,128 A | | 9/1985 | Breeden | |
| 4,544,103 A | | 10/1985 | Breeden | |
| 4,614,306 A | * | 9/1986 | Doggett | 99/492 X |
| 4,623,097 A | | 11/1986 | Sontheimer | |
| 4,629,131 A | | 12/1986 | Podell | |
| 4,674,690 A | | 6/1987 | Ponikwia et al. | |
| 4,706,896 A | | 11/1987 | Moon-Kau | |
| 4,741,482 A | * | 5/1988 | Coggiola et al. | 99/492 X |
| 4,799,626 A | | 1/1989 | Hickel et al. | |
| 4,819,882 A | * | 4/1989 | Stottmann et al. | 99/492 X |
| 4,821,968 A | | 4/1989 | Fleche | |
| 4,824,029 A | | 4/1989 | Stottmann et al. | |
| 5,037,033 A | | 8/1991 | Stottmann et al. | |
| 5,353,697 A | * | 10/1994 | Venturati et al. | 99/492 |
| 5,445,070 A | | 8/1995 | Rebel | |
| 5,454,299 A | * | 10/1995 | Gonneaud | 99/492 |
| 5,486,665 A | | 1/1996 | Le Rouzic | |
| 5,544,573 A | * | 8/1996 | Gateaud | 99/492 |
| 5,655,649 A | | 8/1997 | Lazzer | |
| 5,979,806 A | | 11/1999 | Borger et al. | |

(Continued)

FOREIGN PATENT DOCUMENTS

| | | |
|---|---|---|
| CA | 1 123 802 | 10/1982 |
| DE | 102 19 763 | 11/2002 |
| GB | 2 375 036 | 6/2002 |

*Primary Examiner*—Timothy F. Simone
(74) *Attorney, Agent, or Firm*—Lawrence Cruz; Steven A. Garner

(57) ABSTRACT

A locking system for an appliance has lid and feed chute locking components that include a spring-biased, ramp surfaced pivoting arm that is adapted to be activated to extend or retract a rod that activates or de-activates a motor drive of a food processor. The arm is activated by rotational movement of the lid relative to the bowl, as an extension member attached to the lid, which is activated by insertion of the plunger, extends downwardly from the lid and engages the ramp surface of the pivoting arm when the lid is rotated. Thus, the plunger can remain inside of the food chute of the lid while the lid is removed or replaced.

11 Claims, 9 Drawing Sheets

U.S. PATENT DOCUMENTS

| | | |
|---|---|---|
| 6,340,124 B1 | 1/2002 | Charles et al. |
| 6,375,102 B1 | 4/2002 | Bouleau et al. |
| 6,474,578 B1 | 11/2002 | Gonneaud et al. |
| 6,510,784 B1 | 1/2003 | Fevre et al. |
| 6,568,843 B1 | 5/2003 | Lai |
| 6,640,694 B2 | 11/2003 | Brezovnik et al. |
| 6,669,124 B2 | 12/2003 | Lazzer et al. |
| 6,776,086 B1 * | 8/2004 | Chang Chien ............... 99/492 |
| 6,814,323 B2 | 11/2004 | Starr et al. |
| 2004/0046660 A1 | 4/2002 | Obersteiner |
| 2003/0010222 A1 | 1/2003 | Fevre et al. |
| 2003/0205635 A1 | 11/2003 | Lazzer et al. |
| 2005/0000370 A1 | 1/2005 | Kernan |

* cited by examiner

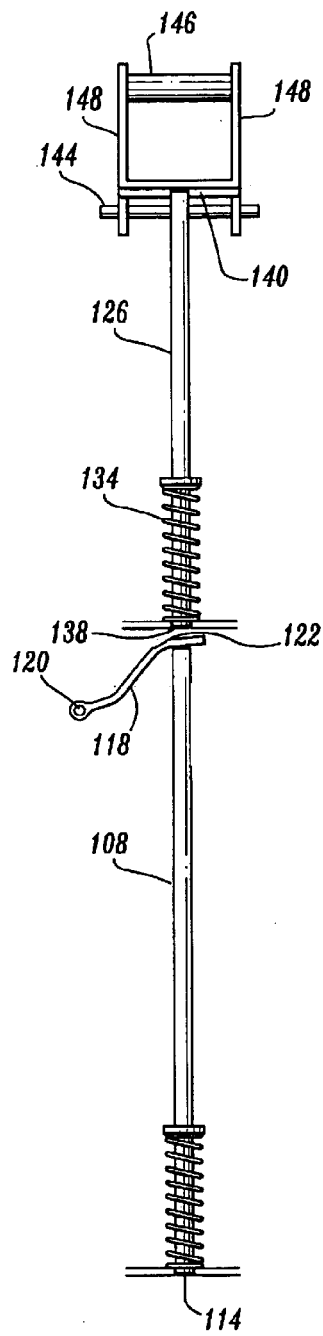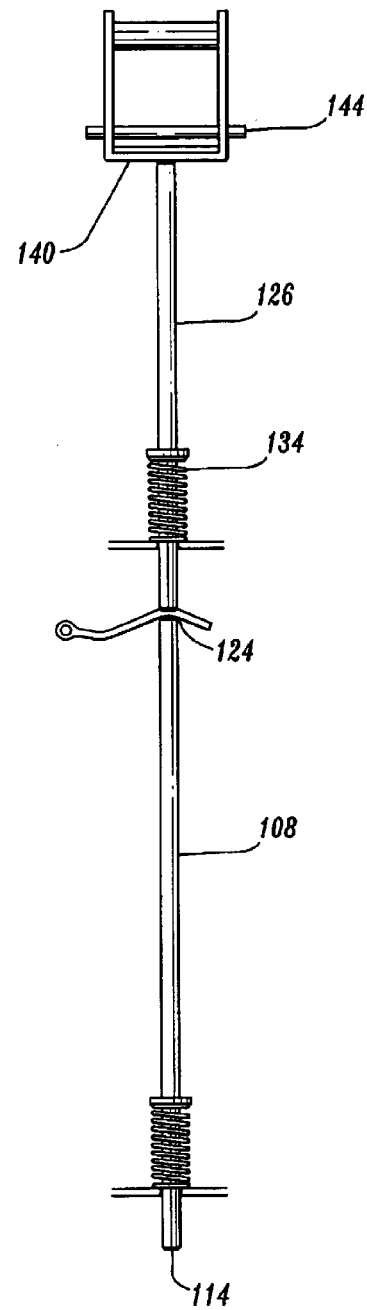
FIG. 4A  FIG. 4B

FLIP RAMP MECHANICAL INTERLOCK FOR APPLIANCE

CROSS-REFERENCE TO RELATED APPLICATIONS

This application claims priority to and the benefit of the filing date of provisional application No. 60/483,934, filed Jul. 1, 2003.

BACKGROUND OF THE INVENTION

1. Field of the Invention

The present invention relates to appliances such as food appliances and, more particularly, to appliances in which a mechanical lock is used to prevent activation of a motor or drive until a physical condition is satisfied such as when a cover is securely fastened on a food processor.

2. Description of Related Art

It is known in the art to provide mechanical activations means in various forms that activate a drive or motor when a device is in a condition such as a locked position for safety or proper function. Such devices are in a disabled mode when the condition is not met, such as when a lock or cover is not in place.

Specifically with respect to food processors, such as the one schematically shown in FIGS. 1–2. As shown in the exploded diagram of FIG. 1, a food processor base (10) has contained therein a motor and drive means (not shown) to engage and drive a blade shaft and blade (not shown) within a cylindrically shaped bowl (12) for chopping or mixing food. The motor or drive is rendered operable, or activated, only when a switch (14) is activated. A first rod (16) is located within a hollow channel (18) adjacent to a handle (20) outside of the bowl (12). The first rod (16) is biased by a spring (22) that engages a first flange (24) fixed to the rod (16). A second flange (26) is located at the top of the rod (16). Referring to FIG. 2, the first rod (16) is moved against the spring (22) by a downward force directed from a second rod (30) that is fixed to a plunger (28), when the plunger (28) is pushed into a food chute (32) which is integrally formed with a round lid (34) that covers the bowl (12). A channel (36) is provided for the second rod (30) to pass through. When the first rod (16) is moved as shown in FIG. 2, its lower end engages the switch (14) to activate the motor or drive in the base (10).

A problem associated with a design such as that described in FIGS. 1–2, is that when the second rod (30) is engaged as shown in FIG. 2, it is not possible to remove the lid (34) from the bowl (12), since the lid (34) locks relative to the bowl (12) by a relative rotational motion about axis Z in order to engage ramp wedges or bayonet lock features (not shown) commonly used on food processor lids. Thus, attempting to unlock the lid (34) from the bowl (12) by relative rotation would be prevented because the second rod (30) extends between the two and acts like a deadbolt or sliding lock. When it is desired to remove the lid (34) to access the inside of the bowl (12), therefore, it is necessary to first remove the plunger (28) from the food chute (32) to that the second rod (30) no longer impedes the rotational movement of the lid (34) relative to the bowl (12). This is cumbersome and may create a mess in the working space since food particles may be attached to the plunger (28). This problem is associated with known food processors of the type having a wide mouth feed chute, since these are designed to be disabled when the plunger is not inside the feed chute as a safety measure.

It is desirable, therefore, to provide a superior mechanical system for enabling and disabling a motor or drive in a food processor of the type having a wide mouth feed chute that facilitates removal of a lid from a bowl without the need to first remove the plunger.

These and other objects are achieved by the present invention described herein.

BRIEF SUMMARY OF THE INVENTION

The present invention locking system for an appliance is directed to lid and feed chute locking components that include a spring-biased, ramp surfaced pivoting arm that is adapted to be activated to extend or retract a rod that activates or de-activates a motor drive of a food processor. The arm is activated by rotational movement of the lid relative to the bowl, as an extension member attached to the lid, which is activated by insertion of the plunger, extends downwardly from the lid and engages the ramp surface of the pivoting arm when the lid is rotated. Thus, the plunger can remain inside of the food chute of the lid while the lid is removed or replaced.

BRIEF DESCRIPTION OF THE DRAWINGS

FIGS. 4A–4B are partial, diagrammatic front views of the present invention.

DESCRIPTION OF THE PREFERRED EMBODIMENT

Figure 1:
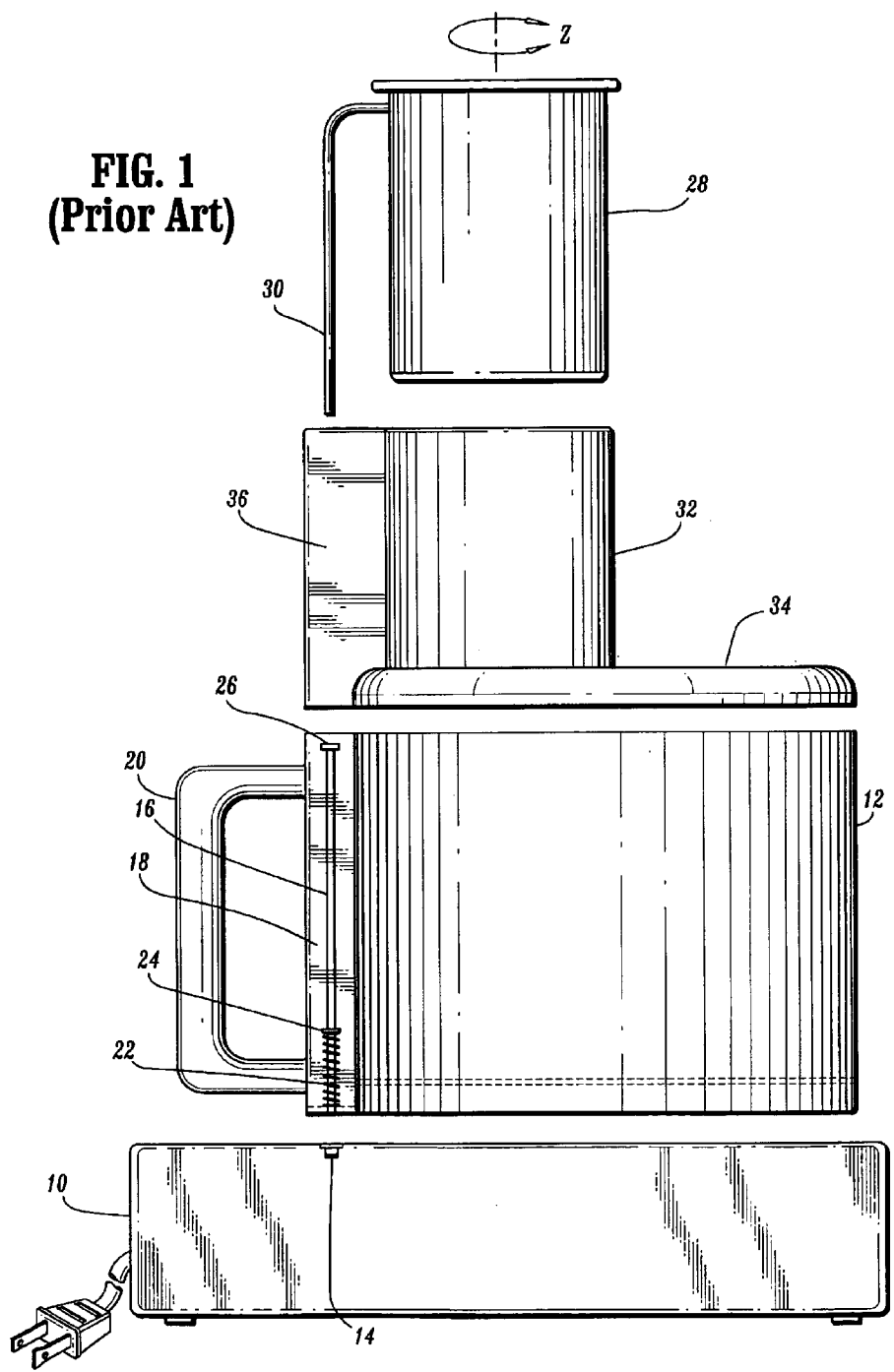
FIGS. 1–2 are diagrammatic illustrations in the exploded side, and side view, respectively, of a prior art appliance.
Figure 2:
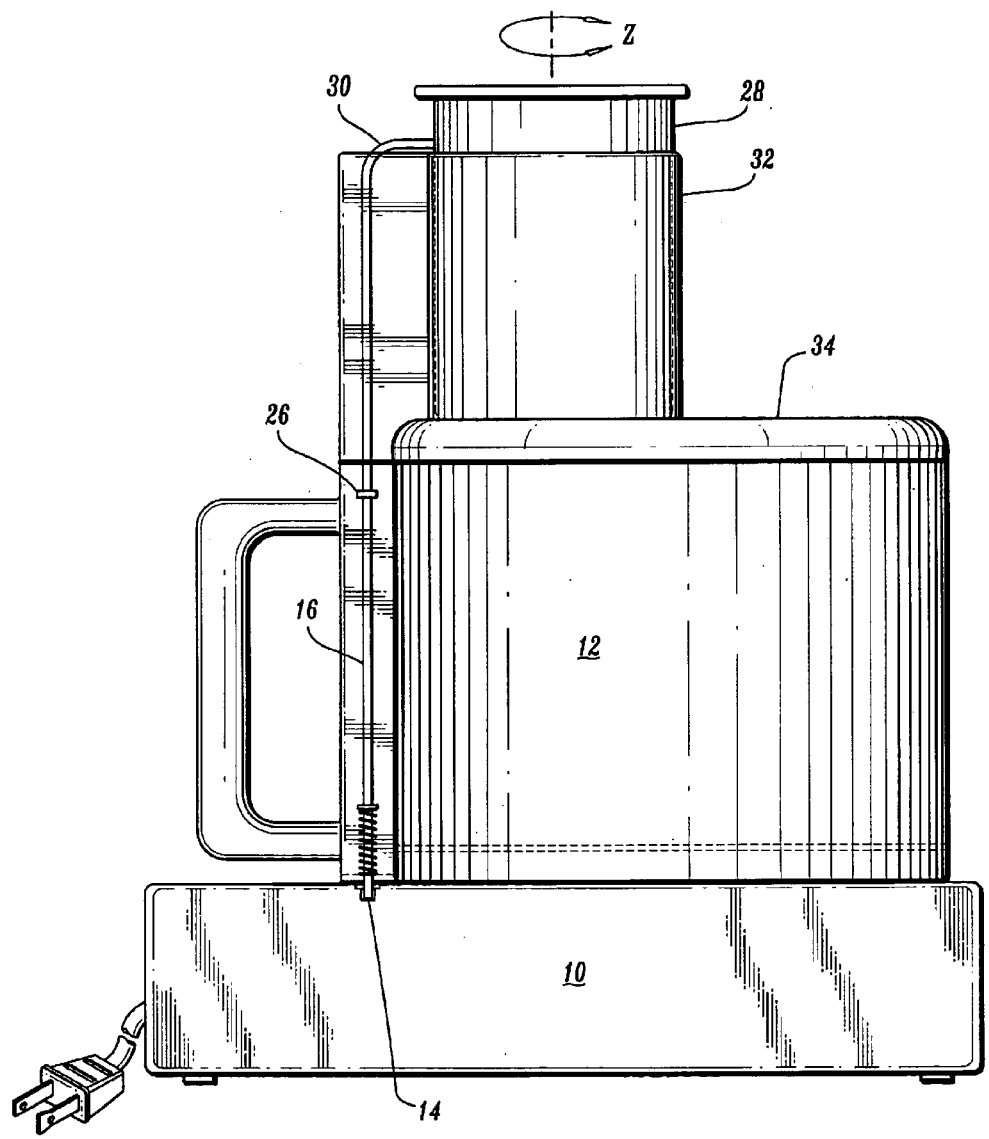
Figure 3:
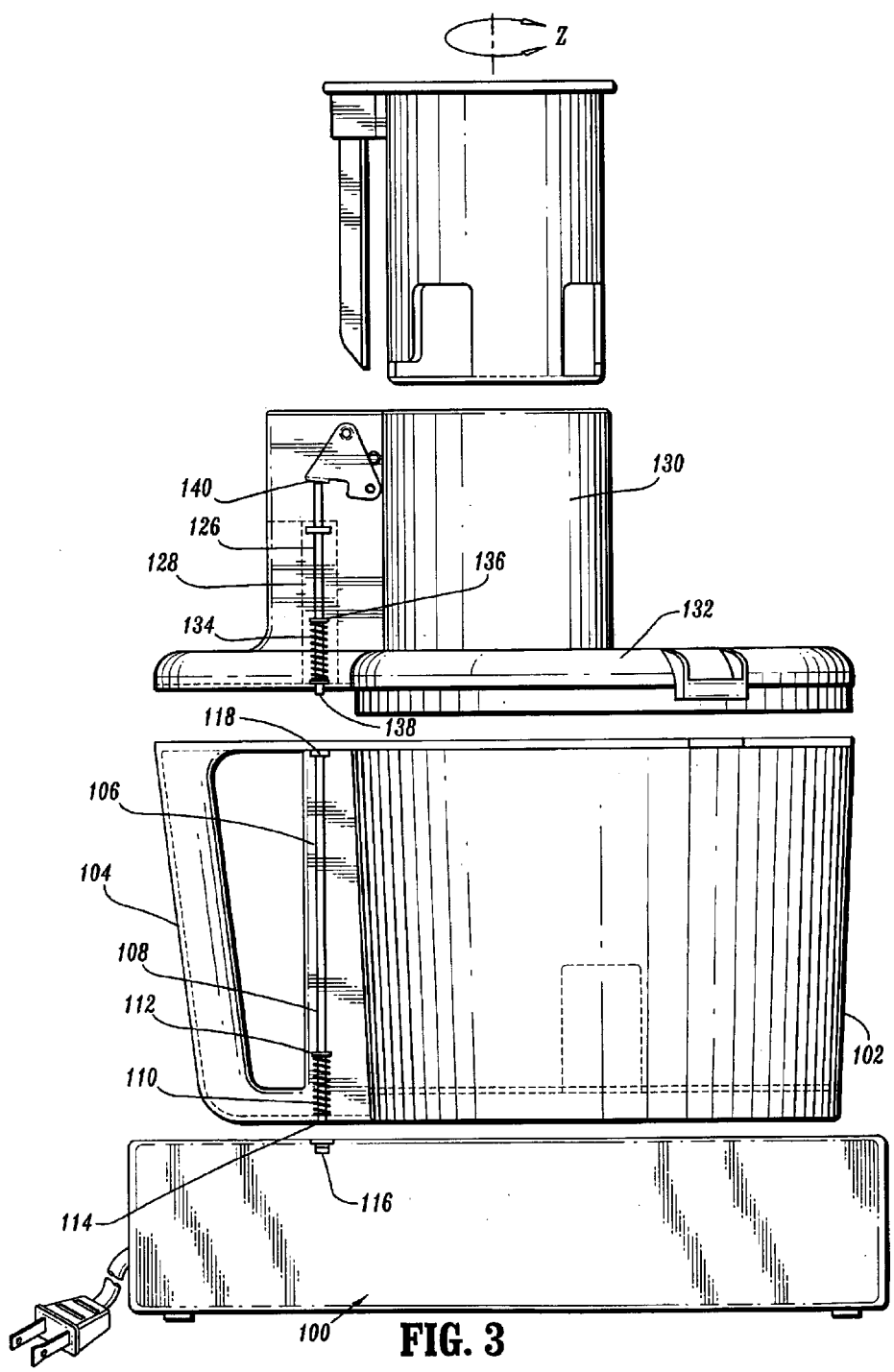
FIG. 3 is a diagrammatic side view of an appliance in accordance with a preferred embodiment of the present invention.

A schematic side view of the present invention is shown in FIG. 3. A base (100) houses an electric motor and drive assembly of the type generally known (not shown) for driving a food processor blade (not shown) housed in the cylindrically shaped bowl (102). The bowl (102) comprises a handle (104) and a vertical channel (106). Located in the vertical channel (106) is a linearly movable rod (108) that is mounted for vertical movement within the channel (106). The rod (108) is supported on a compression spring (110) that cooperates with a flange (112) on the rod (108). The tip (114) of the rod (108) extends through an opening in the channel (106) so that it may extend below the bowl (102) when the spring (110) is compressed. When the spring (110) is fully compressed, the rod tip (114) engages a switch (116) of the type generally known that enables or activates the electric motor and/or drive for the food processor blade. When the spring (110) is relaxed, the rod tip (114) is disengaged from the switch (116).

Referring to FIGS. 3, 4A and 4B, where FIGS. 4A and 4B are partial, schematic front views of the present invention, a pivoting arm (118) hinged at a pin (120) and having an upper contact surface (122) and a lower contact surface (124) is positioned above the first rod (108) so that the lower contact surface (124) is in contact with the top of the first rod (108). A second rod (126) is mounted in a vertical channel (128) formed adjacent to a food chute (130) that is integral with the lid (132). The second rod (126) is mounted for vertical movement within the channel (128) and is supported by a compression spring (134) that engages a flange (136) on the rod (126). As shown in FIG. 4A, when the second rod (126) is resting and the compression spring (134) is relaxed, the tip (138) of the second rod (126) is positioned above the arm (118). As shown in FIG. 4B, when the compression spring (134) is compressed, the tip (138) extends downwardly. This causes the tip (138) to contact the switch (116) and activate the motor and/or drive of the chopping blade.

The second rod (126) is moved downwardly by a force applied by a contact member (140) of a pivoting mechanism (142) that comprises a hinge (144), a roller (146) supported by a pair of upper arms (148) connected to the hinge (144), and the contact member (140) which comprises two arm parts and a contact area that contacts the rod (126).

Figure 5:
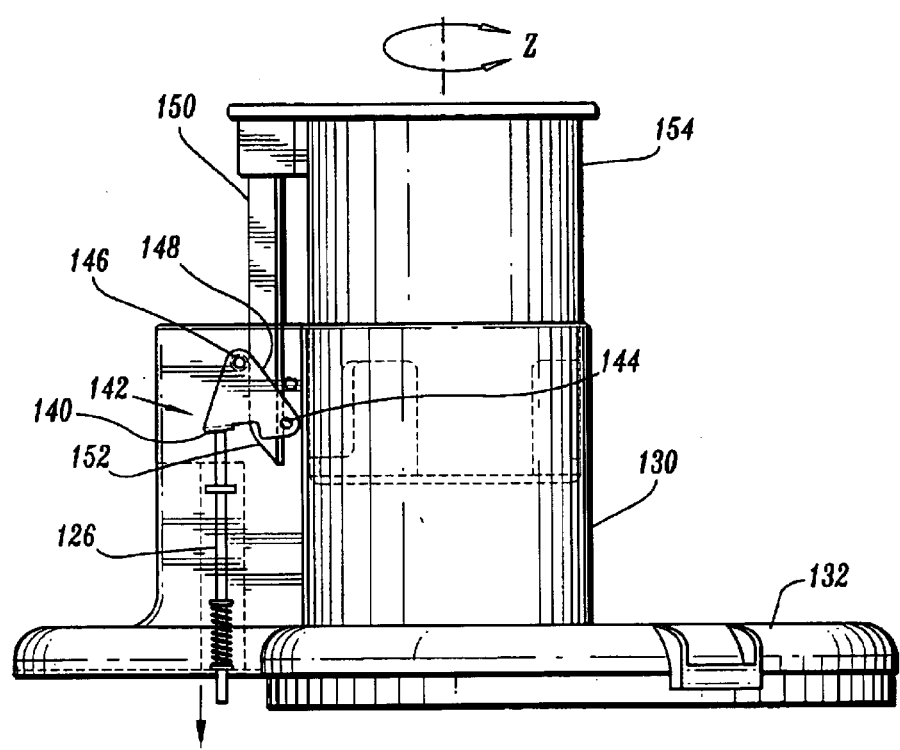
FIG. 5 is a partial, diagrammatic side view of the present invention.

The pivoting mechanism (142) is caused to pivot between the positions shown in FIGS. 4A–4B by force applied through an elongated beveled member (150) having an upper end attached to the plunger (154) and a lower end (152) that is beveled. In a condition where the lid (132) is secured in place, and the first rod (108) and the second rod (126) are vertically aligned, the plunger (154) is pushed into the food chute (130), the lower end (152) bevel engages the roller (146) and causes the pivoting mechanism (142) to pivot from the position of FIG. 4A to the position of FIG. 4B as a result of the roller (146) riding up the beveled section and onto the maximum width of the beveled member (150) as shown in FIG. 5.

Figure 6:
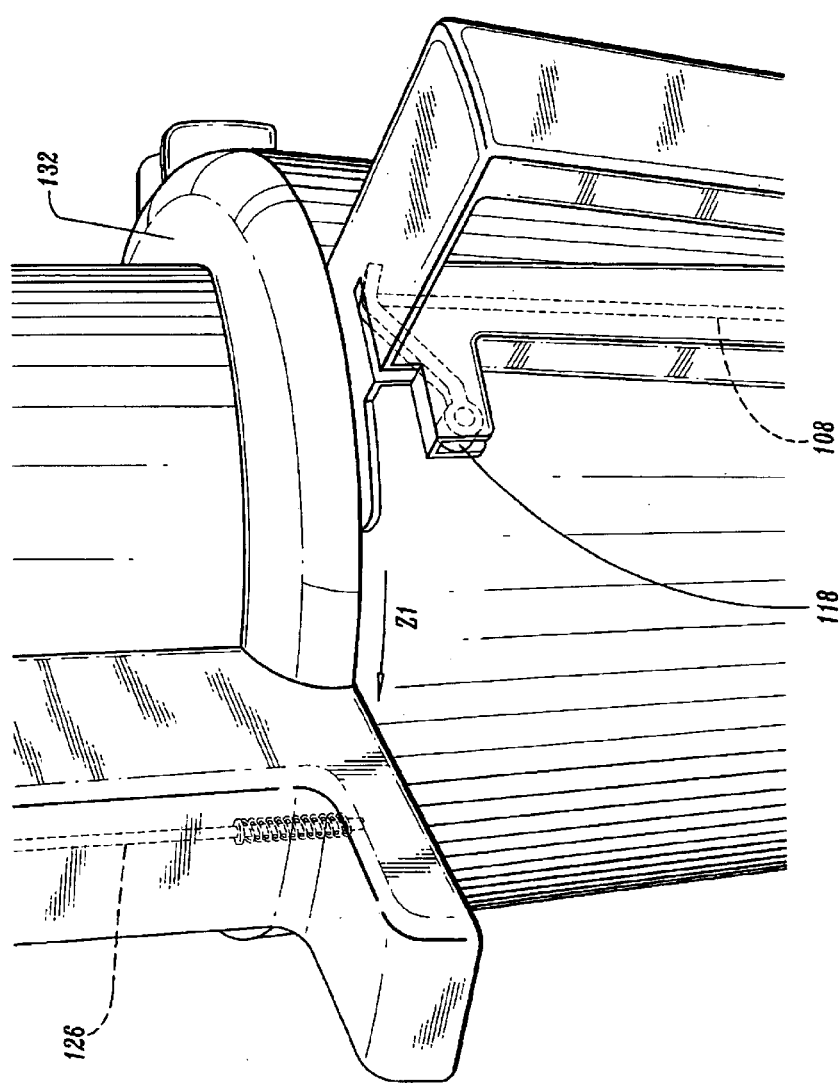
FIG. 6 is a partial, diagrammatic perspective view of the present invention.

In order to remove the lid (132) without first removing the plunger (154), the lid (132) is rotated relative to the bowl (102) in the direction Z1 as shown in FIG. 6. This movement causes the second rod (126) to move in from the condition of FIG. 4B to the condition of FIG. 6, thereby releasing the pivoting arm (118) so that it is free to pivot up as shown in FIG. 6 and in FIG. 4A under the force of the spring (110). This action disables the switch (116) be allowing the first rod (108) to move upward under the bias of the spring (110). In order to re-attach the lid (132) and re-activate the switch (116), the rotational movement of the lid (132) is reversed, opposite of Z1, so that the second rod (126) will ride against the pivoting arm (118) to cause the condition shown in FIG. 4B.

If desired, the plunger (154) may be removed from the chute (130) causing the first and second rods to release the switch under spring pressure.

Figure 7:
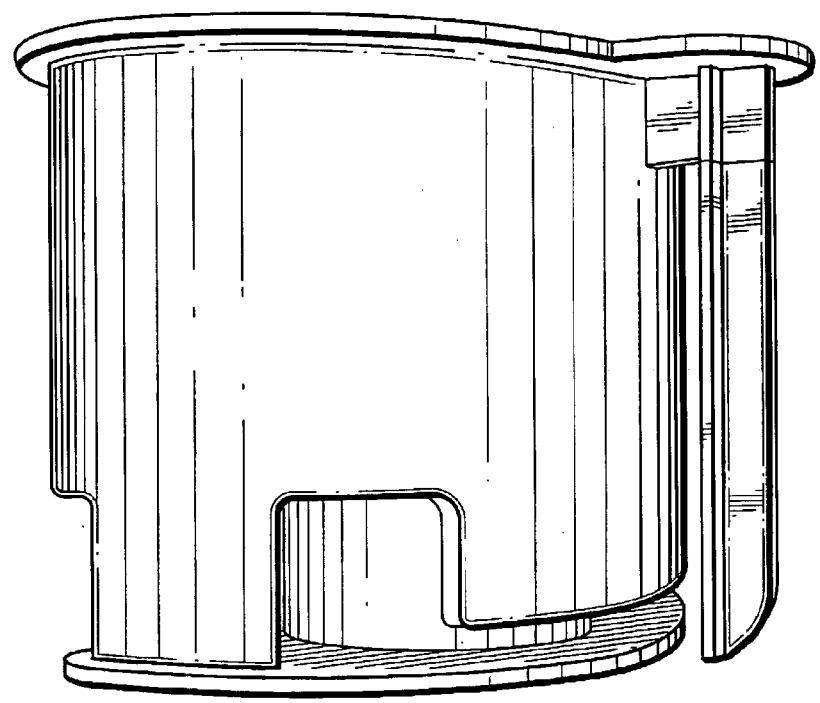
FIG. 7 is a side view of a component of the present invention.
Figure 8:
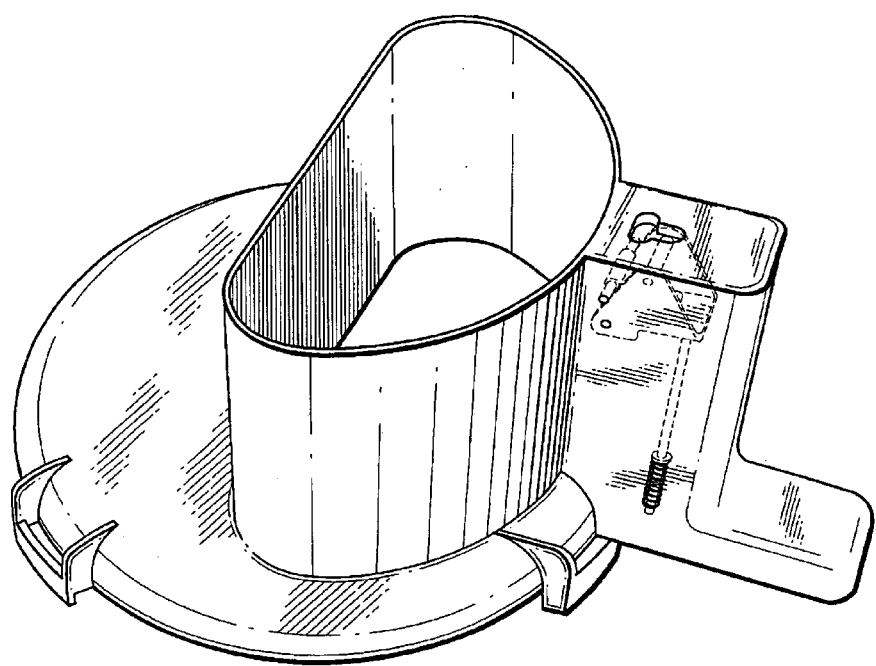
FIG. 8 is a perspective view of a component of the present invention.
Figure 9:
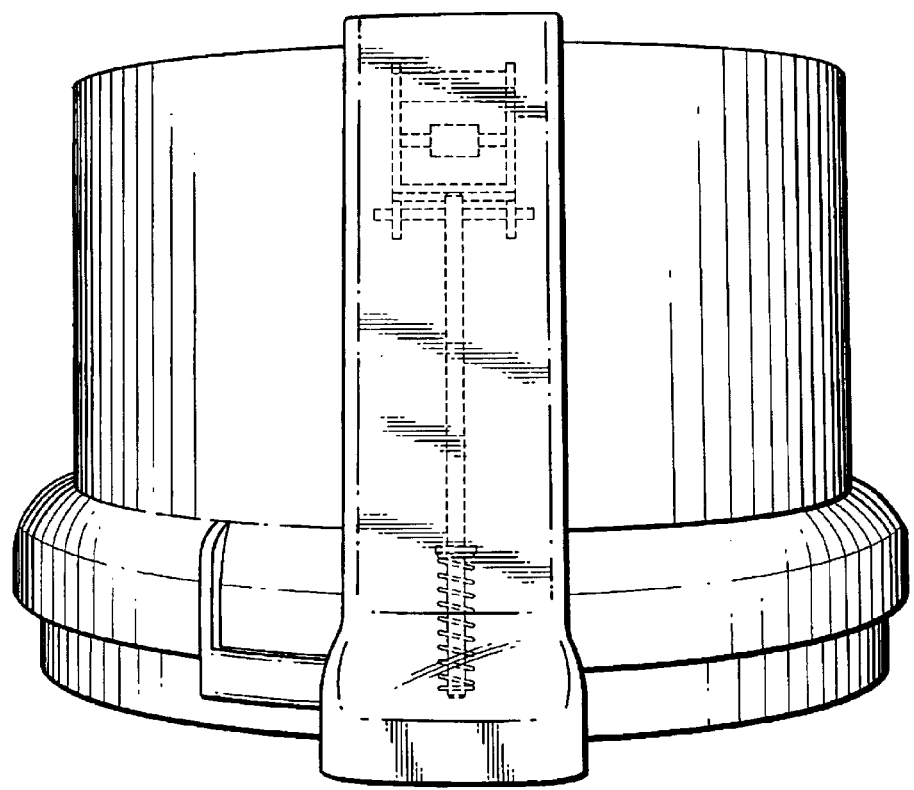
FIG. 9 is a front view of a component of the present invention.

FIG. 7 is an illustration of the plunger (154) and beveled member (150). FIGS. 8–9 are illustrations of the lid and chute (130), the second rod (126), and the pivoting mechanism (142).

It is understood that the present invention has applicability to other appliances and is not limited to food processors. While a preferred embodiment of the invention has been herein disclosed and described, it is understood that various modifications can be made without departing from the scope of the invention.

What is claimed is:

1. An interlock mechanism for appliances comprising:
    a first rod movable along a first axis between an upper position and a lower position for selectively depressing a switch;
    a second rod movable along a second axis between an upper position and a lower position and being positioned further from said switch than said first rod and adapted to be selectively aligned along said first axis and said first rod to selectively engage said first rod;
    a pivoting mechanism adapted to selectively press said second rod into contact with said first rod;
    an elongated beveled member for contacting said pivoting mechanism to cause said pivoting mechanism to pivot into contact with the top of said second rod; and
    a pivoting arm located between said first rod and said second rod for enabling said second rod to selectively engage and disengage from said first rod when said first rod is in said upper position and when said second rod is in a lower position.

2. An interlock mechanism according to claim 1, further comprising
    a first spring cooperating with said first rod for biasing said first rod away from said switch; and
    a second spring cooperating with said second rod for biasing said second rod away from said first rod.

3. An interlock mechanism according to claim 1, wherein said pivoting arm has a ramp surface.

4. An interlock mechanism according to claim 1, wherein said pivoting mechanism comprises:
    a hinge;
    a roller supported by a plurality of arms; and
    a contact member further comprising a contact surface for contacting said second rod.

5. An interlock mechanism according to claim 1, further comprising
    a bowl having a handle and a first channel wherein said first rod is located within said first channel.

6. An interlock mechanism according to claim 5, further comprising
    a food chute having a second channel wherein said second rod is located within said second channel.

7. An interlock mechanism according to claim 6, further comprising
    a lid integral with said food chute.

8. An interlock mechanism according to claim 7, further comprising
    a plunger telescopically engageable with said food chute wherein the upper end of said elongated beveled member is attached to said plunger.

9. An interlock mechanism according to claim 8, wherein said switch is released by removing said plunger from said food chute, whereby said second spring biases said second rod away from said first rod and said first spring biases said first rod away from said switch.

10. An interlock mechanism according to claim 8, wherein
    said switch is released without removing said plunger from said food chute by rotating said lid relative to said bowl, whereby said second spring biases said second rod away from said first rod and said first spring biases said first rod away from said switch.

11. An interlock mechanism according to claim 10, wherein
    releasing said switch by rotating said lid relative to said bowl disengages said lid from said bowl.

* * * * *

UNITED STATES PATENT AND TRADEMARK OFFICE
CERTIFICATE OF CORRECTION

PATENT NO. : 6,907,819 B2
DATED : June 21, 2005
INVENTOR(S) : Colin Michael Kernan It is certified that error appears in the above-identified patent and that said Letters Patent is hereby corrected as shown below:

Title page,
Insert Item -- [73] Assignee: Conair Corporation, Stamford, CT --.

Signed and Sealed this

Twenty-third Day of August, 2005

JON W. DUDAS
*Director of the United States Patent and Trademark Office*